United States Patent [19]

Beebe

[11] Patent Number: 5,309,377
[45] Date of Patent: May 3, 1994

[54] CALIBRATION APPARATUS AND METHOD FOR IMPROVING THE ACCURACY OF TIRE UNIFORMITY MEASUREMENTS AND TIRE TESTING METHOD USING SAME

[75] Inventor: James C. Beebe, Kent, Ohio

[73] Assignee: Illinois Tool Works Inc., Glenview, Ill.

[21] Appl. No.: 788,086

[22] Filed: Nov. 5, 1991

[51] Int. Cl.$^5$ .............................................. G01D 5/25
[52] U.S. Cl. ................................ 364/571.04; 364/506; 364/571.01; 364/571.02; 73/1 B; 73/1 R; 73/8; 73/146
[58] Field of Search .................. 364/571.01, 571.02, 364/571.04–571.08, 560, 474.35, 507, 506, 508, 576; 73/1 B, 1 R, 1 J, 146, 146.8, 146.2–146.5, 8

[56] References Cited

U.S. PATENT DOCUMENTS

| | | | |
|---|---|---|---|
| 3,899,917 | 8/1975 | Kisbany | 73/8 |
| 4,067,060 | 1/1978 | Poussart et al. | 364/576 |
| 4,357,823 | 11/1982 | Lock | 73/1 B |
| 4,404,848 | 9/1983 | Iwama et al. | 73/146 |
| 4,800,749 | 1/1989 | Merrick | 73/1 B |
| 4,805,125 | 2/1989 | Beebe | 73/8 |
| 4,955,229 | 9/1990 | Himmler | 73/146 |

FOREIGN PATENT DOCUMENTS

| | | | |
|---|---|---|---|
| 1583753 | 8/1990 | U.S.S.R. | 73/1 R |
| 2108674 | 5/1983 | United Kingdom | 73/1 R |

Primary Examiner—Jack B. Harvey
Assistant Examiner—Hal D. Wachsman
Attorney, Agent, or Firm—Ruden, Barnett, McClosky, Smith, Schuster & Russell

[57] ABSTRACT

A tire uniformity inspection machine is calibrated by applying to at least one force measuring channel thereof a signal which simulates the application of a force of a magnitude greater than any force actually applied to the machine during calibration. That signal, which is preferably of a magnitude appropriate to simulate the largest forces encountered during actual tire testing, can be generated by connecting the channel, preferably at its input, to an energy source through an impedance. The response of the channel to the signal is measured and a calibration factor is determined based on that response. Such calibration factor accounts for the actual behavior of the channel more truely than prior art calibration techniques which relied solely upon the relatively small signal excitation conditions achievable by applying a relatively small actual force to the machine. Thus, the invention affords tire uniformity measurements of improved accuracy.

18 Claims, 2 Drawing Sheets

CALIBRATION APPARATUS AND METHOD FOR IMPROVING THE ACCURACY OF TIRE UNIFORMITY MEASUREMENTS AND TIRE TESTING METHOD USING SAME

FIELD OF THE INVENTION

The invention pertains to the field of tire uniformity testing. More particularly, the invention relates to a novel apparatus and method for calibrating a force measuring channel of a tire uniformity testing machine and to a tire testing method using same. The invention contemplates generating and applying to the channel a signal which simulates the application of a large force to the force transducer to which the channel is connected. That signal, which can be generated by connecting the channel to an energy source through a fixed impedance, is used to determine a more accurate calibration factor for the channel than prior art systems thus affording uniformity measurements of improved accuracy.

BACKGROUND OF THE INVENTION

Nonuniformity-indicating parameters are measured using a tire uniformity inspection machine. In a typical tire uniformity inspection machine, tires are conveyed to a test station where each tire is mounted upon a chuck, inflated and rotated with its tread surface in forced radial contact with the circumferential surface of a loadwheel. The loadwheel is a rigid cylindrical structure which rotates freely on a spindle due to its engagement with the tire. To measure forces exerted on the loadwheel by the tire in directions of interest, the opposite ends of the loadwheel spindle are each fitted with force transducers. Those transducers typically comprise triaxial loadcell assemblies mounted for sensing forces in three mutually orthogonal directions, namely; the radial, lateral and tangential directions. For each of these directions, each loadcell assembly includes a series of four strain gauges connected in a conventional bridge arrangement so as to respond to forces acting in a particular direction by generating an analog signal whose instantaneous magnitude is correlated to the instantaneous magnitude of that force. The analog signals from the appropriate loadcells at opposite ends of the spindle are then combined in order to report the total force acting on the loadwheel in a particular direction. The combined force signal is then applied as an input to an analog signal processing network associated with one of a number of distinct measuring channels. Force measuring channels may be of either a "suppressed" or "unsuppressed" type.

A typical unsuppressed measuring channel has at its front end an instrumentation amplifier. In addition to amplifying the signal, the instrumentation amplifier serves to electrically isolate the force transducer as well as to add or subtract any required offset to the signal generated by the transducer. The output of the instrumentation amplifier is usually applied to an active filter to attenuate frequencies other than those of significance. The output of the filter represents an unsuppressed analog signal which is then applied to an analog to digital (A/D) converter and converted to a digital signal representing the nominal unsuppressed output of the channel. A computer samples the output of the A/D converter and digitally processes the information in order to calculate the value of a given nonuniformity-indicating parameter characterizing the tire under test. A plurality of different nonuniformity-indicating parameters characterizing the same tire are usually measured substantially simultaneously by each of the remaining channels of the tire uniformity inspection machine. Those parameters are then typically displayed, recorded and/or compared with specification criteria in order to initiate further action such as rejecting the tire if the specification criteria are not met or, in appropriate cases, initiating corrective measures such as grinding the tire in selected areas in order to improve its performance.

The average radial load impressed on the tire to establish a desired test condition is quite large in relation to the force variations actually generated by the tire. Thus, when measuring a nonuniformity-indicating parameter correlated to radial force variation, the total instantaneous force registered by the force transducer includes not only a component indicative of the force variations generated by the tire under test but also a much larger component representing the average radial load on the tire. During operation of a typical tire uniformity inspection machine for testing, the loadwheel exerts an average radial load of about two thousand pounds on the tire under test whereas the actual force variations generated by the tire are typically less than about twenty pounds. To increase the resolution of force variation measurements made under such conditions, it is common practice to measure such a parameter using what is known as a suppressed channel of the tire uniformity inspection machine in order to cancel the effects of the large average radial load. A suppressed channel is similar to the unsuppressed channel described above except that it includes a suppression network between the filter and A/D converter.

The suppression network includes a summer which subtracts from the unsuppressed signal, which represents the total force on the transducer, a suppression signal representing the average radial load on the tire in order to cancel that component from the unsuppressed signal. In order to minimize inaccuracies due to noise and quantization error, the resulting signal is then applied to an amplifier whose gain is selected to be large enough so that the magnitude of the largest signal expected to be generated by the amplifier will correspond to the upper end of the input range of the A/D converter. The output of the amplifier is applied to the A/D converter which, in response, generates a digital signal representing the nominal suppressed output of the channel.

After the output of the A/D converter associated with either a suppressed or unsuppressed channel is sampled by the computer, the computer derives an indicated value, I, for each data sample, A, by solving an equation of the form:

$$I = (A - T) * C \qquad \text{EQUATION 1}$$

In the above equation, the data sample term, A, corresponds to the "actual" output of the A/D converter of the channel as originally sampled by the computer when a tire is being inspected. The term T, for "tare", is a constant representing the magnitude of the observed output of the A/D converter with no external load applied to the force transducer. The term "C" is a calibration factor which the machine must apply so that the "indicated value" equals as nearly as possible the true externally applied force. The tare and calibration factor terms determined and stored prior to initiating out tire inspection operations. The calibration factor is determined by carrying out a calibration procedure.

That procedure includes applying a relatively small known force to the force transducer using weights of modest size. Such weights total less than about one hundred pounds and typically weigh about fifty pounds in all. The use of such small weights is possible because the strain gauge loadcells typically used as force transducers in tire uniformity inspection machines have a fairly linear transfer function (i.e., ratio of output voltage to applied force) over their more than two thousand (2000) pound typical operating range. Such weights are applied to the machine so as to act on the transducer along the same direction as the forces to which the channel being calibrated is to respond during tire testing. This is accomplished by attaching the weights to the loadwheel or to the loadwheel spindle using fixtures connected to the machine either directly or, indirectly through a cable and pulley system.

Determination of the calibration factor in the conventional manner was straightforward and was based solely on the magnitude of the digital signal generated by the A/D converter of the channel in response to the aforementioned weight. The calibration factor was calculated simply as the ratio represented by the magnitude of the output of the A/D converter to the magnitude of the known applied force.

SUMMARY OF THE INVENTION

The invention recognizes that prior art calibration techniques are deficient in that they do not excite the channel with a signal of the large magnitudes encountered by the channel during actual tire testing. As a result, the value of the calibration factor determined using those techniques is not as accurate as possible. Notwithstanding the linearity of the force transducers used typical tire uniformity testing machines, this invention recognizes that components in the measuring channel itself including the amplifiers and the like as well as the A/D converter contribute significant errors. For instance, it has been determined that low frequency noise in the amplifiers and quantization errors in the analog to digital converters limit the accuracy of the calibration factor determined using prior art techniques to about five percent. This can limit the overall force measuring accuracy of the machine to several tenths of a pound under certain conditions. As tire uniformity requirements have become increasingly stringent, measurement errors on the order of even a few tenths of a pound are significant and can determine the ability of the machine to discriminate correctly between acceptable tires and unacceptable ones.

While existing apparatus and methods for calibrating tire uniformity inspection machines account acceptably for the behavior of the force transducers themselves, they account for errors arising elsewhere in the measuring channel only to the extent those errors appear under the relatively small-signal excitation conditions achieved by applying relatively small weights to the force transducers.

It is an object of the invention to provide an apparatus and method for calibrating a tire uniformity inspection machine which provides improved measurement accuracy by determining a calibration factor more accurately than has heretofore been possible.

It is a further object of the invention to provide an accurate calibration apparatus and method which does not require the use of calibration weights of larger than conventional size.

It is another object of the invention to provide an accurate calibration apparatus and method which can be used for calibrating either suppressed or unsuppressed force measuring channels.

It is yet another object of the invention to provide a method of testing a tire using a machine which has been calibrated using the above needed calibration apparatus and method and is thus, more accurate than conventional tire testing methods.

The invention fulfills the above objectives by providing an apparatus and method for calibrating a tire uniformity inspection machine which simulate the application to the force transducer a force whose magnitude is greater than any actual force applied thereto during the calibration procedure and preferably is comparable in magnitude to signals expected to be generated by the force transducer during actual tire inspecting operations. More particularly, the invention contemplates determining a calibration factor based the transfer function of the force transducer as well as on the observed response of the channel to a signal which is generated, at least in part, by means other than the force transducer on the machine in order to simulate the application of a relatively large force thereto. That signal is preferably of a magnitude comparable to that of the largest combined force signal expected to be reported by the force transducer during actual tire inspection operations. Further according to the invention, such a signal is generated by connecting the channel, preferably at its input, to a source of electrical energy through a fixed impedance. The calibration factor is then determined based on the transfer function of the force transducer and the observed response of the channel to the signal. Because such a signal excites the channel more greatly than can be achieved using weights of conventional size, the effects of errors whose magnitudes may not be significant when the machine is so weighted can be more effectively accounted for by the calibration factor determined using the invention which thus results in tire uniformity measurements of improved accuracy.

These and other aspects and advantages of the invention will become apparent to those of ordinary skill in the art upon review of this document including the claims, the detailed description of the preferred embodiment and the accompanying drawings wherein like reference numerals indicate like items.

DETAILED DESCRIPTION OF THE PREFERRED EMBODIMENT

Figure 1:
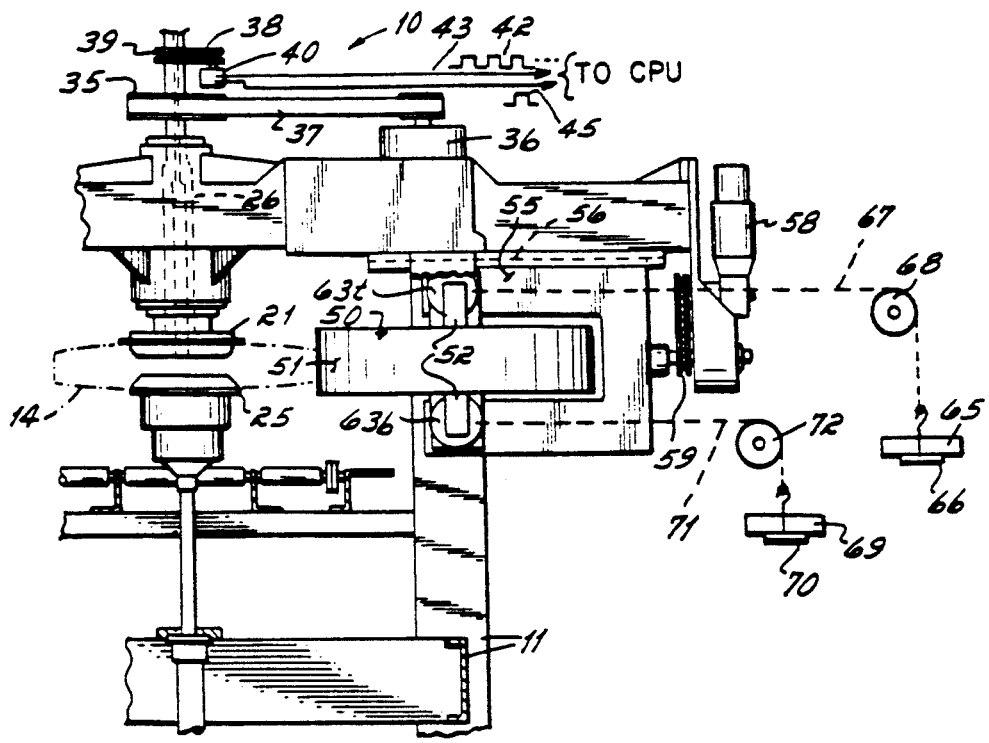
FIG. 1 is a partial side elevational view of a tire uniformity inspection machine shown schematically with fixturing and weights attached for calibration purposes.

As shown in FIG. 1, a tire uniformity inspection machine 10 according to a preferred embodiment of the present invention includes a frame 11 which supports mutually opposed upper and lower chucks 21 and 25, respectively, which cooperate to support a tire 14 to be tested.

In order to rotate tire 14 at a desired test speed, upper tire spindle 26 is fitted with a drive pulley 35 connected to a drive motor 36 by way of a timing belt 37. A rotary shaft encoder 40 is connected by chain 38 and sprocket 39 or a belt and pulley to rotate synchronously with upper tire spindle 26 and hence, tire 14. Once during each rotation of tire 14, shaft encoder 40 produces a series of 128 nominally equally angularly spaced rotation pulses 42 on line 43. Each rotation pulse 42 specifies a particular rotational position of tire 14 which can be identified according to its position with respect to a position reference pulse 45, one of which is generated by encoder 40 each revolution of tire 14.

A cylindrical loadwheel 50 having a circumferential surface 51 is supported by loadwheel spindles 52 for free rotation about an axis parallel to that of the tire 14 under test. Loadwheel spindles 52 are in turn supported by a carriage 55 which is slidably secured to frame 11 by one or more ways 56 as to be moveable in the radial direction toward and away from tire 14 so that a desired average radial load can be imposed upon tire 14 to establish a standard test condition prior to the taking of measurement data. As carriage 55 urges loadwheel 50 radially inward (to the left in FIG. 1) against tire 14, the radial load on tire 14 increases. Carriage 55 is movable radially back and forth by a reversible D.C. motor 58 acting through a drive chain 59. The preferred apparatus and method for establishing a desired average radial load on tire 14 during testing thereof is more fully described in my commonly assigned U.S. Pat. No. 4,704,900 which is expressly incorporated herein by reference in its entirety.

Loadwheel 50 is instrumented with a force transducer 63 which, in the preferred embodiment, comprises a pair of triaxial strain gauge loadcell assemblies, one of which, 63t, is mounted to the top end of loadwheel spindle 52 and the other one of which, 63b, is mounted to the bottom end of loadwheel spindle 52. Loadcell assemblies 63t and 63b are wired together as shown to generate a combined analog force signal which is correlated with the instantaneous force transmitted by the tire 14 under test to load-wheel 50 in the direction along which assemblies 63t and 63b respond.

For the purpose of determining the transfer function of force transducer 63 as will be explained in further detail below, machine 10 is shown in FIG. 1 with a weight 65 mounted on a hanger fixture 66 and attached to the upper end of loadwheel spindle 52 by a cable 67 reaved around a pulley 68. In a similar fashion, a second weight 69 is mounted upon a second hanger fixture 70 and attached to the lower end of spindle 52 by way of a second cable 71 reaved around a second pulley 72. Together, weights 65 and 69 exert a radially directed force on force transducer 63. Using similar techniques known to those of ordinary skill in the art, weights can also be applied to machine 10 so as to apply a force to loadcell assemblies 63t and 63b in either the lateral or tangential directions. Weights 65 and 69 should be of equal mass and should have a combined total weight which need not exceed about one hundred pounds and preferably about fifty pounds.

Figure 2:
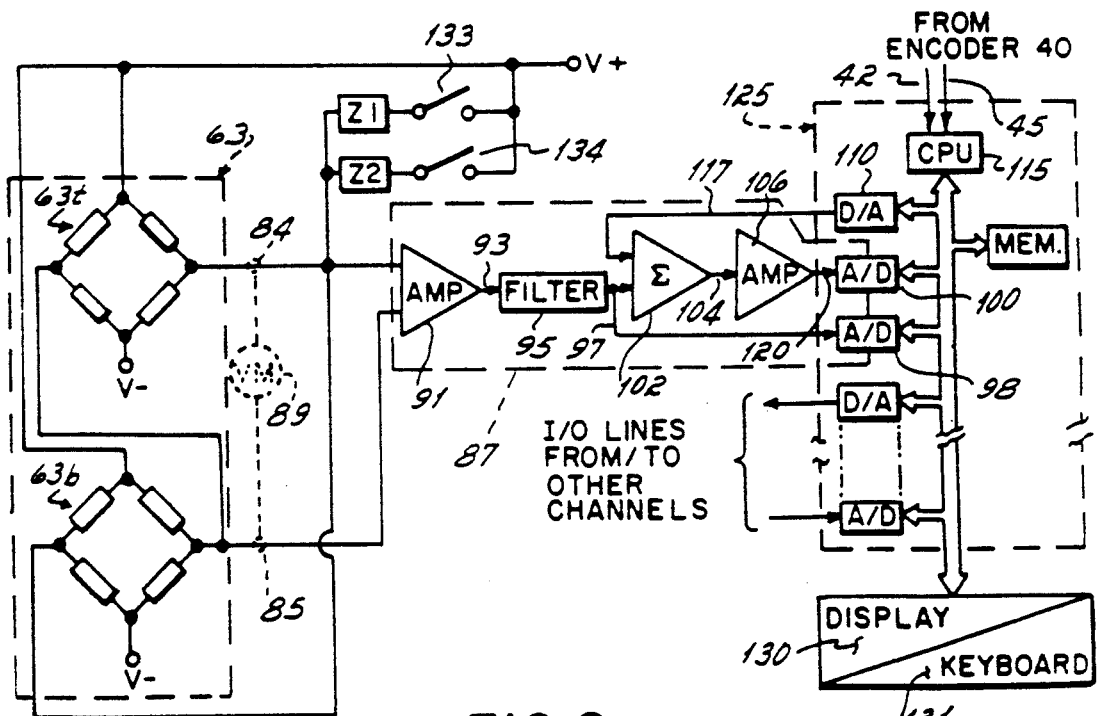
FIG. 2 is a partial schematic block diagram of the machine of FIG. 1 according to a preferred embodiment of the invention.

With reference now to FIG. 2, there is depicted force transducer 63 which, as noted previously, in the preferred embodiment comprises a pair of strain gauge loadcell assemblies 63t and 63b. For a purpose to be described later, a voltmeter 89 may be connected at the input of both the suppressed and unsuppressed channels across terminals 84 and 85 to read the magnitude, V, of the signal being applied to the channel. Preferably, voltmeter 89 is a precision voltmeter having at least a forty millivolt range and a resolution of one microvolt or better and may suitably comprise a Model 8810A digital multimeter available from John Fluke Manufacturing Co. of Everett, Wash. or equivalent.

Channel input terminals 84 and 85 are connected to a signal processing network 87 having at its front end an instrumentation amplifier 91 which amplifies the signal appearing across terminals 84 and 85 by a gain which, in the case of a channel responsive to radial force variation in passenger car tires, is typically on the order of about two hundred (200). Amplifier 91 also electrically isolates transducer 63 from the remainder of the channel and applies any required offset. Amplifier 91 generates a single-ended output signal 93 which is applied to the input of a filter 95 which serves to eliminate from signal 93 frequency components other than those of interest. The output of filter 95 comprises an unsuppressed analog signal 97 which, in the case of an unsuppressed channel, is applied to the input of an A/D converter 98 associated with that channel.

In the case of a suppressed channel, such as that associated with an A/D converter 100, unsuppressed signal 97 is applied to a suppression network connected ahead of A/D converter 100. The suppression network comprises a digital-to-analog (D/A) converter 110 which receives from a central processing unit (CPU) 115 a digital signal of a magnitude correlated to the magnitude of a D.C. component to be subtracted from signal 97 and generates a corresponding suppression signal 117 which summer 102 subtracts from unsuppressed signal 97 in order to generate a difference signal 104. Signal 104 is then applied to the input of amplifier 106 whose output represents a suppressed analog signal 120 which is in turn applied to the input of A/D converter 100. Amplifier 106 has a gain selected to scale signal 104 such that the expected range of signal 120 spans substantially the entire input range of A/D converter 100 thus providing improved measuring resolution.

A/D converters 98 and 100 as well as D/A converter 110 in the preferred embodiment form part of a computer 125 which includes CPU 115. In order to determine the proper intervals for sampling the outputs of the A/D converters as well as to permit computer 125 to determine the rotational position and/or velocity of tire 14 during tire inspecting operations, signals 42 and 45 communicate with CPU 115 through suitable I/O ports. Computer 125 is also connected by way of one or more suitable I/O ports to a display 130 such as a CRT as well as to a keyboard 131.

To calibrate machine 10 prior to carrying out actual tire inspecting operations, the invention provides a novel apparatus and method for determining a calibration factor as well as tire testing method using same. One important aspect of the invention contemplates exciting each force measuring unsuppressed channel by applying thereto a so-called "first" signal whose magnitude, S1, is greater than the magnitude of any signal being generated by transducer 63 at the time the first signal is applied. The first signal is generated at least in part by means other than force transducer 63 and is preferably a D.C. signal applied at the input of signal processing network 87. The first signal should be stable and have a magnitude of the same order of magnitude as the largest signals usually generated by transducer 63 when machine 10 is engaged in actual tire inspecting operations. In particular, the first signal should have a magnitude in the range of about 50% to 100% and preferably about 75% of the full scale output of transducer 63 thus simulating the application of a large force (e.g., 2000 pounds) to loadwheel 50.

While the aforementioned first signal may be generated in any convenient fashion, such as by applying an external signal generator across terminals 84 and 85, a further aspect of the invention contemplates generating such a signal by connecting an impedance, arbitrarily designated here as Z1, between a source of electrical energy, such as power supply V+, and the input of signal processing network 87. This can be accomplished by connecting power supply V+ to terminal 84 by way of impedance Z1 and a series switch element 133 which remains open during tire inspecting operations but which can be closed for calibrating machine 10. This impedance is selected in relation to the energy level of the energy source such that the resulting first signal will be of the desired magnitude. In the preferred embodiment, impedance Z1 comprises a twenty-five (25) kilohm resistance provided by a resistor of a stable resistance type such as a commonly available type RN55D or equivalent.

For calibrating each suppressed type force measuring channel of machine 10, the invention further contemplates exciting the channel with a so-called "second" signal whose magnitude, S2, is greater than any signal being generated by transducer 63 at the time the second signal is being applied. This second signal, which is also preferably a D.C. signal applied at the input of signal processing network 87, should be stable and be of a magnitude such as to cause the output of amplifier 106 to assume about 50% to 100% and preferably about 75% of its full scale output.

The invention contemplates generating such a second signal by selectively connecting an impedance between an energy source, such as power supply V+, and the channel Such connection is preferably made at the input of signal processing network 87. That impedance is selected in relation to the energy level of the energy source such that the resulting second signal will be of the desired magnitude and may conveniently be formed as the equivalent impedance of impedance Z1 connected in parallel with a second impedance Z2. In the preferred embodiment, this is accomplished by connecting additional impedance Z2 in parallel with impedance Z1 between power supply V+ and terminal 84 through a switch element 134 as shown. In the preferred embodiment, impedance Z2 suitably comprises a 500 kilohm resistance provided by a resistor of a stable resistance type such as the aforementioned type RN55D. Since the parallel combination of impedances Z1 and Z2 represents a slightly lower equivalent impedance than Z1 alone, the second signal applied to the channel when Z1 and Z2 are both connected is of a magnitude, S2, which is slightly greater than the magnitude, S1, of the first signal. Thus, in the preferred embodiment, application of the second signal to the channel simulates the application of a slightly greater force to loadwheel 50 than that simulated by the first signal. Having described the structure of machine 10, the procedure for calibrating each force measuring channel thereof will now be described.

Figure 3:
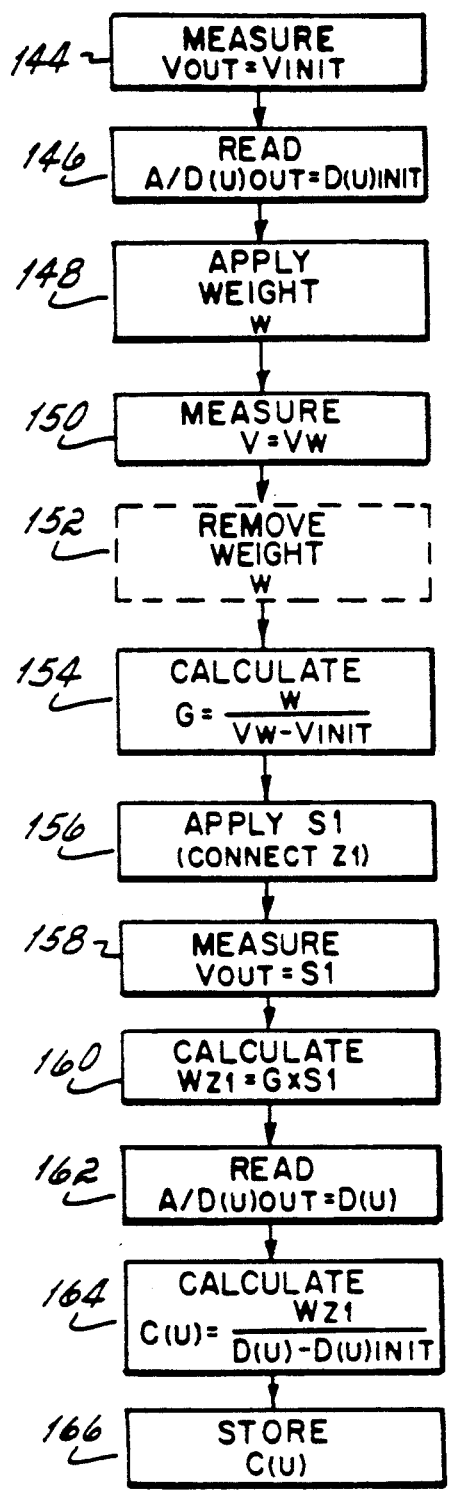
FIG. 3 is a flow diagram illustrating a preferred embodiment of the method of the invention for calibrating an unsuppressed channel of the tire uniformity inspection machine of FIGS. 1 and 2.

FIG. 3 sets forth the basic steps for determining a calibration factor, $C(u)$, of an unsuppressed channel of tire uniformity machine 10. It is assumed that switch elements 133 and 134 are both initially open. As indicated at step 144, voltmeter 89 is connected across terminals 84 and 85 at the input of signal processing network 87 to measure the voltage, V, appearing there. That value, arbitrarily designated here as Vinit, is recorded for use in subsequent calculations. Step 144 should be carried out while the force transducer 63 of machine 10 is under a substantially unloaded condition. While step 144 may suitably be carried out with no external load whatsoever applied to transducer 63, it is preferably carried out while any fixtures, such as fixtures 66 and 70, as well as any cables, such as cables 67 and 71, which are necessary to apply weight to machine 10 in step 148 which will be described shortly are attached to machine 10. The digital output, $A/D(u)out$, of the A/D converter 98 associated with the unsuppressed channel is then read at step 146 and its value, arbitrarily designated here as Dinit, is recorded for use in subsequent calculations.

At step 148 a known total force such as that due to weight, W, is applied to transducer 63 so as to simulate the application of a corresponding force in the appropriate direction. As noted previously, weight W need not exceed about one hundred (100) pounds and is preferably about fifty (50) pounds. In the case of a radial force measuring channel, such a force may conveniently be applied by attaching weights 65 and 69 to machine 10 in the manner described earlier with reference to FIG. 1. With weight W so applied, the voltage, V, appearing across terminals 84 and 85, is measured at step 150 using voltmeter 89. The measured magnitude of that voltage, arbitrarily designated as a value Vw, represents the response of transducer 63 to the application of the actual force caused by weight W. Value Vw is recorded for use in subsequent calculations. As indicated at step 152, weights 65 and 69 as well as fixtures 66 and 70 and cables 67 and 71 are then preferably, but optionally, detached from machine 10. At step 152 a value arbitrarily designated as G representing the magnitude of the transfer function associated with transducer 63 is calculated as the ratio of weight value W to the difference between values Vw and Vinit.

After the aforementioned transfer function value, G, has been determined, either according to steps 144, 148, 150, 152 and 154 as described above or using any other suitable technique, impedance Z1 is connected in step 156 so as to excite the channel with the aforementioned first signal. This is done by connecting impedance Z1 between power supply V+ and the input of signal processing network 87 at terminal 84. In the preferred embodiment, step 156 is carried out simply by closing switch element 133. In the next step 158, the magnitude, S1, of the first signal is measured with precision by again reading voltage V using voltmeter 89. Magnitude value S1 is then recorded for use in subsequent calculations. Next, in step 160, the apparent force or "weight", arbitrarily designated here as Wz1, whose application was simulated by the application of the first signal is calculated as the product of transfer function value G and magnitude value S1. Stated another way, Wz1 represents the equivalent weight that would have to be applied to transducer 63 in order to generate a signal of the same magnitude as that applied by connecting impedance Z1.

In step 162, and with impedance Z1 still connected, the magnitude of the digital signal, A/D(u)out, then appearing at the output of the A/D converter 98 is read and recorded for use in subsequent calculations as a value arbitrarily designed here as D(u). In step 164, the calibration factor for the unsuppressed channel, arbitrarily designated here as C(u), is calculated as the ratio of value Wz1 to the difference between values D(u) and D(u)init. At step 164 the calibration factor value, C(u), so determined is then entered via keyboard 131 and retrievably stored in memory within computer 125 so as to be selectively available for solving an equation of the form of Equation 1 in the course of determining the value of at least one nonuniformity-indicating parameter characterizing a tire 14 when machine 10 is in use.

It is noted that in cases where actual weight W was not previously removed by carrying out optional step 152, value Wz1 will reflect the sum of the actual force applied by weight W as well as the apparent force simulated by the connection of impedance Z1. Likewise, the value of first signal S1 measured in step 158 will also include a component generated by force transducer 63 corresponding to the actual applied weight W. Even so, the ultimately determined calibration factor value, C(u), will be the same whether optional step 152 is carried out or not.

Figure 4:
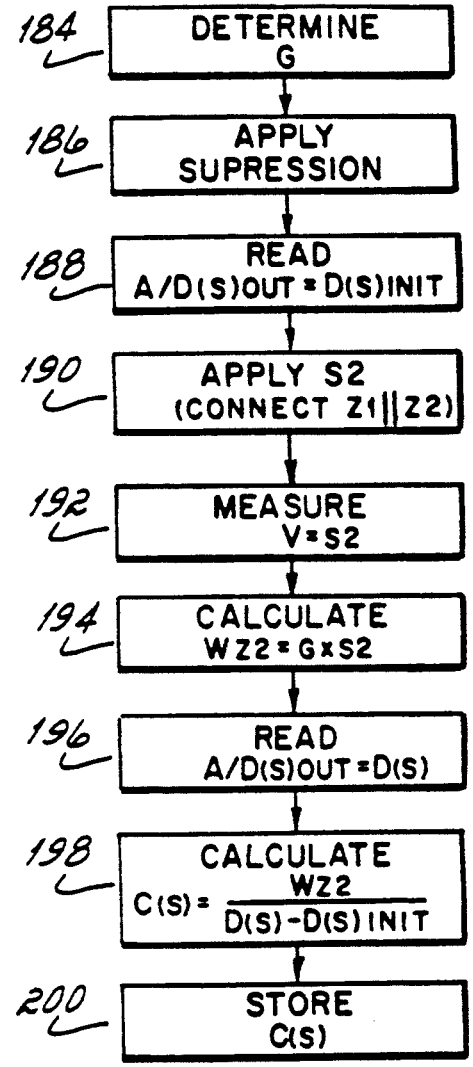
FIG. 4 is a flow diagram illustrating a preferred embodiment of the method of the invention for calibrating a suppressed channel of the tire uniformity inspection machine of FIGS. 1 and 2.

Referring now to FIG. 4, the steps for determining the calibration factor, C(s), for a suppressed channel of machine 10 will now be described. It is assumed that switch elements 133 and 134 are both open at the outset of these steps. The transfer function value G, characterizing the operation of transducer 63 is determined in any suitable manner as indicated at step 184. While any suitable technique for determining this transfer function value may be used, step 184 preferably comprises carrying out steps 144, 148, 150, 152 and 154 as described above with reference to FIG. 3 although step 152 remains optional.

Next, as indicated at 186, a suppression signal 117 of a magnitude which is preferably sufficient to substantially null the first signal is applied to one input of summer 102. To carry out this step, switch element 133 is closed so as to apply the first signal to the channel. CPU 155 then executes an instruction to read the magnitude value of the digital output signal, A/D(s)out, generated by A/D converter 100 in response to the first signal and to apply a digital signal of that same magnitude to the input of D/A converter 110. D/A converter 110 then generates suppression signal 117 so as to be of a corresponding magnitude and applies suppression signal 117 to summer 102. Thereafter, switch element 133 is opened so as to remove the first signal prior to the execution of step 188. With suppression signal 117 still applied to summer 102 the digital output signal, A/D(s)out, generated by the analog-to-digital converter 100 associated with the suppressed channel is read at step 188 and its magnitude value, arbitrarily designated here as D(s)init, is recorded for use in subsequent calculations.

A so-called "second" signal of a magnitude, S2, is then applied to excite the channel in step 190. As in the case of the first signal, this second signal is preferably applied at terminals 84 and 85 which define the input to the channel via signal processing network 87. While the second signal can be applied in any suitable manner, such as by connecting a signal generator across terminals 84 and 85, a further aspect of the invention contemplates that the second signal be generated by connecting an impedance between power supply V+ and terminal 84. In the preferred embodiment, this is accomplished simply by closing both switch elements 133 and 134 so that the last mentioned impedance is defined by the parallel combination of impedances Z1 and Z2. With impedances Z1 and Z2 in parallel connecting power supply V+ with terminal 84, the magnitude, S2, of the second signal generated thereby is measured with precision at step 192 by once more reading the voltage, V, across terminals 84 and 85 using voltmeter 89. Magnitude value S2 is then recorded for use in subsequent calculations.

In a step 194, a value arbitrarily designated here as Wz2 representing the weight whose application is simulated by the application of the second signal to the channel is calculated as the product of S2 and transfer function value G. In step 196, with Z1 and Z2 both remaining connected by virtue of the continued closure of switch elements 133 and 134, a value arbitrarily designated here as D(s) representing the magnitude of the digital signal, A/D(s)out, generated by A/D converter 100 is read and recorded for use in subsequent calculations. Subsequently, in a step indicated as 198, the calibration factor for the suppressed channel, arbitrarily designated here as C(s), is calculated as the ratio of value Wz2 to the difference between values D(s) and D(s)init. Finally, as indicated at step 200 the calibration factor for the suppressed channel is retrievably stored in computer 125 so as to be selectively available for use in computing the value of a nonuniformity-indicating parameter. This may be conveniently accomplished by entering value C(s) into the memory of computer 125 via keyboard 131.

Similar to note taken earlier in connection with the procedure for calibrating the unsuppressed channel, it is noted that where actual weight W is not removed by carrying out optional step 152 during the execution of step 184 for the suppressed channel, value Wz2 will reflect the sum of the actual force applied by weight W as well as the apparent force simulated by the parallel equivalent impedance presented by the connection of impedances Z1 and Z2. Likewise, the value of the second signal S2 in such case will also include a component corresponding to actual weight W. However, the value of the calibration factor, C(s), will be the same whether optional step 152 is carried out or not.

After the calibration factors for each suppressed and unsuppressed channel are determined and retrievably stored in the manner described above, any weights and/or fixtures still applied to machine 10 for calibration purposes are removed and switch elements 133 and 134 are both opened. Machine 10 is then ready to commence testing tires.

In operation, drive motor 36 causes tire 14 mounted on chucks 21 and 25 to rotate at a nominally constant test speed of 60 RPM. Carriage 55 is then driven radially inward toward tire 14 and the average radial load on the tire is established at a desired value in the manner described in the above referenced U.S. Pat. No. 4,704,900. The magnitude of the average radial load so applied corresponds to the magnitude of suppression signal 117 to be applied to summer 102 while tire 14 is being tested.

As previously noted, for each revolution of tire 14, shaft encoder 40 generates one hundred twenty-eight (128) nominally equally angularly spaced rotation pulses 42 and a single reference pulse 45. Since the rotation of encoder 40 is synched to the rotation of tire 14, the rising edge of each rotation pulse 42 represents a particular angular location on tire 14. CPU 115 and the A/D converters 100 and 98 cooperate to digitally sample the suppressed analog signal 120 an the unsuppressed analog signal 97 appearing at their respective inputs. The A/D converters associated with each additional suppressed or unsuppressed channel also sample the signals appearing at their inputs in a similar manner at the rising edge of each rotation pulse 42. For each channel, a data field consisting of a plurality of such data samples is stored by computer 125. From each such data field, the value of a particular nonuniformity-indicating parameter is then calculated by CPU 115. In doing so, the inventions described and claimed in earlier-issued, commonly assigned, U.S. Pat. No. 4,805,125, are employed where applicable in order to provide best measurement accuracy.

The value of each nonuniformity-indicating parameter so determined may be displayed on display 130, retrievably stored in memory and/or compared with specification criteria in order to grade the nonuniformity of the tire and/or in order to initiate further action such as rejecting the tire if the specification criteria are not met. In appropriate cases, such comparison may also be used to initiate appropriate corrective measures such as grinding the tire in selected areas in order to improve its performance. Machine 10 should be calibrated before commencing initial operation and again from time-to-time as often as necessary to maintain accuracy notwithstanding drift in component specifications, ambient changes and the like.

While the apparatus and methods described herein constitute preferred embodiments of the present invention, it is to be understood that the invention is not limited thereby and that in light of the present disclosure, various alternative embodiments will be apparent to persons skilled in the art. Accordingly, it is to be recognized that changes can be made without departing from the scope of the invention as particularly pointed out and distinctly claimed in the claims set forth below including all legal equivalents thereof.

What is claimed is:

1. A method of calibrating a channel of a tire uniformity inspection machine of the type having a force transducer operably coupled thereto, said method comprising the steps of:
    (a) simulating the application to the transducer a force of magnitude greater than any force actually applied to the transducer of the machine during calibration thereof;
    (b) determining a value representing the output of the channel to said simulating step; and
    (c) determining a calibration factor using said value.

2. The method of claim 1 wherein said simulating step comprises the steps of:
    (i) generating a signal at least in part using means other than said transducer; and
    (ii) applying said signal to the channel.

3. The method of claim 2 wherein said signal is of a magnitude equalling at least about 50% of the full scale output of said transducer.

4. The method of claim 2 wherein the magnitude of said signal is of the same order of magnitude as the largest signal usually generated by said transducer when the machine tests tires.

5. A method of calibrating a channel of a tire uniformity inspection machine of the type having a force transducer operably coupled thereto, said method comprising the steps of:
    (a) simulating the application to the transducer a force of magnitude greater than any force actually applied to the transducer of the machine during calibration thereof;
    (b) determining at least one value representing the response of at least a portion of the channel to said simulating step; and
    (c) determining a calibration factor using said value.

6. A method of calibrating a channel of a tire uniformity inspection machine of the type having at least one force transducer connected to the channel, the operation of said transducer being described by a transfer function, said channel including a signal processing network and an analog-to-digital converter operably coupled thereto, said analog-to-digital converter having a digital output for a digital signal as well as an analog input, said network having an input operably coupled to said transducer and an output operably coupled to the analog input of said analog-to-digital converter, said method comprising the steps of:
    (a) applying to said network a signal of the same order of magnitude as that produced by said transducer during a tire testing operation; and
    (b) determining a calibration factor, based on at least said transfer function, said magnitude of said signal and the magnitude of the digital signal appearing at said digital output in response to said signal.

7. The method of claim 6 further comprising the step of determining said transfer function.

8. The method of claim 7 wherein said step of determining said transfer function includes the steps
    (i) applying a force of a given magnitude to said transducer;
    (ii) measuring the magnitude of a signal generated by said transducer in response to said force; and
    (iii) determining said transfer function as a ratio of said given magnitude to said magnitude of said signal.

9. The method of claim 8 wherein said step of applying said force includes the step of attaching weight to the machine, said weight acting on said transducer in a direction along which forces generated by a tire are to be measured.

10. The method of claim 6 further comprising the step of retrievably storing said calibration factor, so as to be available for use in computing the value of a nonuniformity-indicating parameter of a tire inspected using said machine.

11. The method of claim 6 wherein said step of applying said signal comprises the step of connecting said network to an energy source through an impedance.

12. A method of calibrating a channel of a tire uniformity inspection machine of the type having at least one force transducer having a transfer function and being connected to the channel, said channel including a signal processing network and an analog-to-digital converter operably coupled thereto, said analog-to-digital converter having a digital output for a digital signal as well as an analog input, said network having an input operably coupled to said transducer and an output operably coupled to the analog input of said analog-to-digital converter, said method comprising the steps of:

(a) determining a first value correlated to the magnitude of the digital signal appearing at the digital output of said analog-to-digital converter;

(b) applying a signal to said network, the magnitude of said signal being correlated to a second value;

(c) determining a third value whose magnitude is correlated to the product of:
   (i) a fourth value correlated to said transfer function and
   (ii) said second value;

(d) determining a fifth value correlated to the magnitude of the digital signal appearing at the digital output of said analog-to-digital converter in response to the application of said signal to said network; and (e) determining a calibration factor correlated to the ratio of said third value to the difference between said fifth value and said first value.

13. A method of calibrating a channel of a tire uniformity inspection machine of the type having a loadwheel to be pressed against a tire and having at least one force transducer having a transfer function and being connected to the channel, said channel including a signal processing network and an analog-to-digital converter operably coupled thereto, said network having an input operably coupled to said transducer and an output operably coupled to the analog-to-digital converter, said method comprising the steps of:

(a) determining an initial output generated by said analog-to-digital converter when the transducer of said machine is substantially unloaded;

(b) applying a signal of a large magnitude to said network to simulate the application of a force to the transducer;

(c) determining the magnitude of said simulated force by multiplying said transfer function by said large magnitude;

(d) determining a second output generated by said analog-to-digital converter, said second output being generated in response to the application of said signal to said network; and (e) determining a calibration factor as the ratio of the magnitude of said simulated force to the difference between said second output and said initial output.

14. An apparatus for calibrating a channel of a tire uniformity inspection machine of the type having at least one force transducer connected to the channel by way of a signal processing network, said apparatus comprising:

(a) an energy source;

(b) an impedance; and (c) means for selectively connecting the signal processing network to the energy source through said impedance so as to apply to the channel a signal whose magnitude is greater than any signal generated by the transducer at the time said signal is so applied during a calibration procedure.

15. The apparatus of claim 14 wherein said impedance comprises a stable resistance and said energy source comprises a supply of D.C. electrical energy.

16. The apparatus of claim 14 wherein the magnitude of said impedance is selected in relation to the energy level of said energy source such that said signal is of a magnitude which is at least as great as the magnitude of a signal generated by said transducer in response to the application of a force of at least about one thousand pounds thereto.

17. The apparatus of claim 14 wherein the magnitude of said impedance is selected in relation to the energy level of said energy source such that the magnitude of said signal is of the same order of magnitude as the largest signal usually generated by said transducer in response to a tire under test on the machine.

18. A method of testing a tire, said method comprising the steps of:

(a) mounting the tire on a tire uniformity inspection machine of the type having a rotatable loadwheel mechanically coupled to a force transducer having a transfer function, said transducer being connected to a channel which includes a signal processing network and an analog-to-digital converter having a digital output for a digital signal as well as an analog input, said network having an input operably coupled to said transducer and an output operably coupled to the analog input of said analog-to-digital converter, said channel having been calibrated by carrying out the steps of:
   (i) applying to said network a signal having a magnitude which is greater than the magnitude of any signal generated by the transducer in response to any externally-applied force acting on said force transducer at the time said signal is so applied;
   (ii) determining a calibration factor, based on at least said transfer function, said magnitude of said signal and the magnitude of the digital signal appearing at said digital output in response to said signal;
   (iii) retrievably storing said calibration factor;

(b) rotating the tire in forced contact with said loadwheel; and (c) determining the value of at least one nonuniformity-indicating parameter based upon at least one indicated value, I, determined according to an equation of the general form:

$$I = (A - T) \cdot C$$

where A represents the actual magnitude of said digital signal generated by said analog-to-digital converter in response to said rotation of said tire in said forced contact with said loadwheel, T represents a constant, and C represents said calibration factor.

* * * * *